United States Patent [19]
Kugler et al.

[11] Patent Number: 5,383,434
[45] Date of Patent: Jan. 24, 1995

[54] METHOD OF DAMPING ENGINE VIBRATIONS

[75] Inventors: Karl-Heinz Kugler; Karlheinz Riedel, both of Vaihingen, Germany

[73] Assignee: Robert Bosch GmbH, Stuttgart, Germany

[21] Appl. No.: 87,918

[22] Filed: Jul. 6, 1993

[30] Foreign Application Priority Data

Jul. 8, 1992 [DE] Germany ............... 4222298

[51] Int. Cl.⁶ ............................... F02P 5/06
[52] U.S. Cl. ............................ 123/419; 123/436
[58] Field of Search ..................... 123/419, 436

[56] References Cited

U.S. PATENT DOCUMENTS

| | | | |
|---|---|---|---|
| 4,357,662 | 11/1982 | Schira et al. | 123/419 |
| 4,375,668 | 3/1983 | Leung et al. | 123/419 |
| 4,489,692 | 12/1984 | Haraguchi et al. | 123/419 |
| 4,527,523 | 7/1985 | Däumer et al. | 123/419 |
| 5,241,480 | 8/1993 | Takaku et al. | 123/419 |

FOREIGN PATENT DOCUMENTS 4201861 2/1993 Germany.

OTHER PUBLICATIONS

Robert Bosch GmbH, "Motronic Technical Description", 1981 pp. 1–24.
Robert Bosch GmbH, "Combined Ignition and Fuel-Injection System Motronic", 1983, pp. 2–44.

*Primary Examiner*—Noah P. Kamen
*Attorney, Agent, or Firm*—Frishauf, Holtz, Goodman & Woodward

[57] ABSTRACT

The invention relates to a method of damping abnormal vibrations or bucking of spark ignition engines by adjustment of the ignition angle, including simultaneous detection and temporary storage of a value representative of the effective or instantaneous load and, by comparing the load value against successive load values, establishing changes in the load, whereby such change in load, in case a predetermined threshold is exceeded, affects an adjustment of the effective ignition angle, with resetting of the ignition angle to the effective or characteristic field angle taking place as a function of the gradient of engine rotations.

6 Claims, 2 Drawing Sheets

METHOD OF DAMPING ENGINE VIBRATIONS

CROSS-REFERENCE TO RELATED LITERATURE

BOSCH Technical Instruction: *MOTRONIC Combined Ignition and Fuel-Injection System*, pages 1–43, pub. 1983 by Automotive Equipment Div., Robert Bosch GmbH, Stuttgart.

FIELD OF THE INVENTION

The invention relates generally to a method of damping or reducing bucking or abnormal vibrations of spark-ignition engines and, more particularly, to a method of damping abnormal engine vibrations by adjustment of the ignition advance angle to reduce engine torque in the case of increasing engine speed and to increase engine torque in the case of decreasing engine speed.

BACKGROUND

A method of damping abnormal vibrations, also known as "bucking", which may occur in internal combustion einges of the spark-ignition kind, has been proposed in commonly assigned URBANEK German Paent DE 42 01 861 Cl, filed Jan. 24, 1992, to be published Feb. 4, 1993. In accordance with that disclosure, in the event of increasing engine speed, engine torque is reduced by retarding the ignition angle, and in the event of decreasing engine speed, engine torque is increased by advancing the ignition angle.

Engine speed fluctuations are detected by measuring any deviation in speed per unit of time, with a distinction being made simultaneously between bucking vibrations and acceleration intended by an operator. Where the change in speed is caused by bucking, the change in speed is quantified or weighted, and a corrective ignition angle of appropriate sign is added to the effective, normal ignition angle, i.e. ignition timing is either advanced or retarded.

In certain circumstances, damping of bucking or of abnormal vibrations upon detection of deviations in engine rotation may not be achieved sufficiently quickly since the anti-bucking control will not be effective until after the occurrence of initial deviations in speed. That may, however, adversely affect the performance of an internal combustion engine.

THE INVENTION

Briefly, in one advantageous embodiment, the method in accordance with the invention provides for measuring engine speed, reducing or increasing the torque of the engine at increases and decreases in engine speed, respectively. A first value representative of the load of the engine is measured, temporarily stored, and compared against a subsequently measured load value. The difference between the first and subsequent load values is determined. The ignition angle is then adjusted as a function of this difference and of engine speed, with the adjustment being lomited to avoid excessive changes in engine speed.

The method in accordance with the invention provides for an anti-bucking control which is effective substantially earlier, i.e. immediately upon detection of a change in engine load. Further advantages are derived from the degree or extent of ignition angle adjustment being determined by the change in load and by resetting of the ignition angle taking place in dependence of the rate of engine speed. As compared to prior anti-bucking controls, operating solely on the basis of engine speed dynamics, the method in accordance with the invention provides for significantly improved drivability.

The method provides, advantageously, for incrementally resetting the ignition angle to a predetermined effective ignition angle as a function of changes in engine speed, so that the change in engine rotations will occur gradually and in accordance with a predetermined function, see the referenced MOTRONIC publication (figure on page 10).

It is particularly advantageous when the readjustment of the ignition angle toward the predetermined ignition angle as determined by engine characteristics, and which are provided by a characteristic field or table based on these characteristics, is carried out in predetermined steps or increments, using an ignition counter, after each ignition event. This assures that the readjustment of the ignition angle is achieved without a surge in engine speed.

Advantageously, the method may also provide for resetting the ignition angle in dependence of changes in engine rotation as well as on the basis of the ignition counter.

DRAWINGS

FIG. 1 schematically depicts an internal combustion engine and a circuit for detecting engine rotations and load; and FIG. 2 is a flowchart depicting the steps of the method in accordance with the invention.

DETAILED DESCRIPTION OF THE PREFERRED EMBODIMENT

Figure 1:
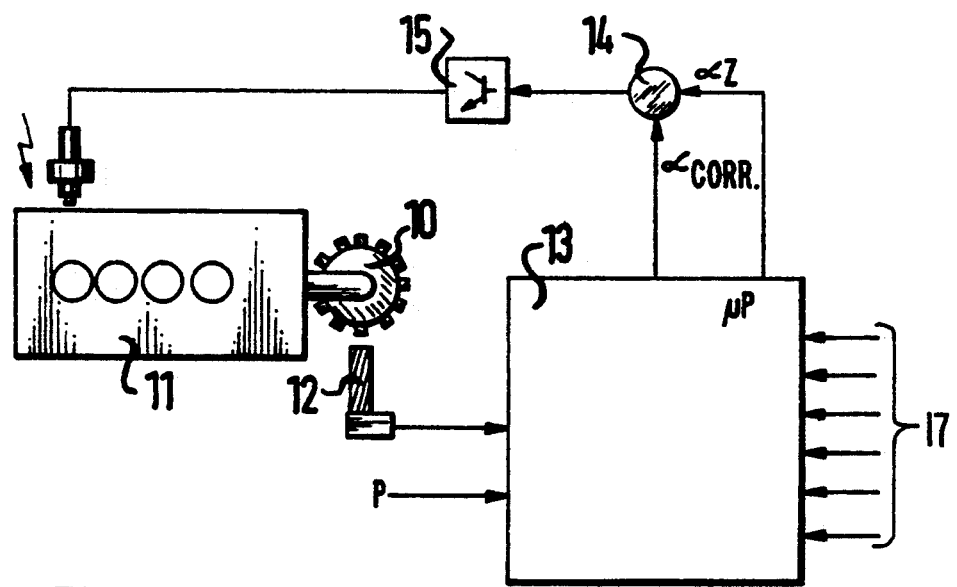

FIG. 1 is a schematic representation of an internal combustion engine including its ignition system. The engine speed n of engine 11 is detected by a tachometer 12 from an encoded wheel 10 or transducer, and is fed to a microprocessor 13. Another input variable fed to microprocessor 13 is a load p. Microprocessor 13 specifies an adjustment of the ignition angle by a correction angle $ALPHA_{corr}$ ($\alpha_{corr}$) in order to avoid the occurrence of abnormal engine vibrations or bucking. In an adder stage 14, the corrective ignition angle $\alpha_{corr}$ is added to a characteristics field ignition angle $\alpha_{z'}$. Ignition is triggered by an ignition stage 15. The normal or characteristic ignition angle $\alpha_z$ is established by the microprocessor 13 as a function of engine speed n, temperature T, and further input values 17, in a manner well known in the art; see Bosch MOTRONIC brochures. Suitable microprocessors include INTEL Model No. 80C537.

Figure 2:
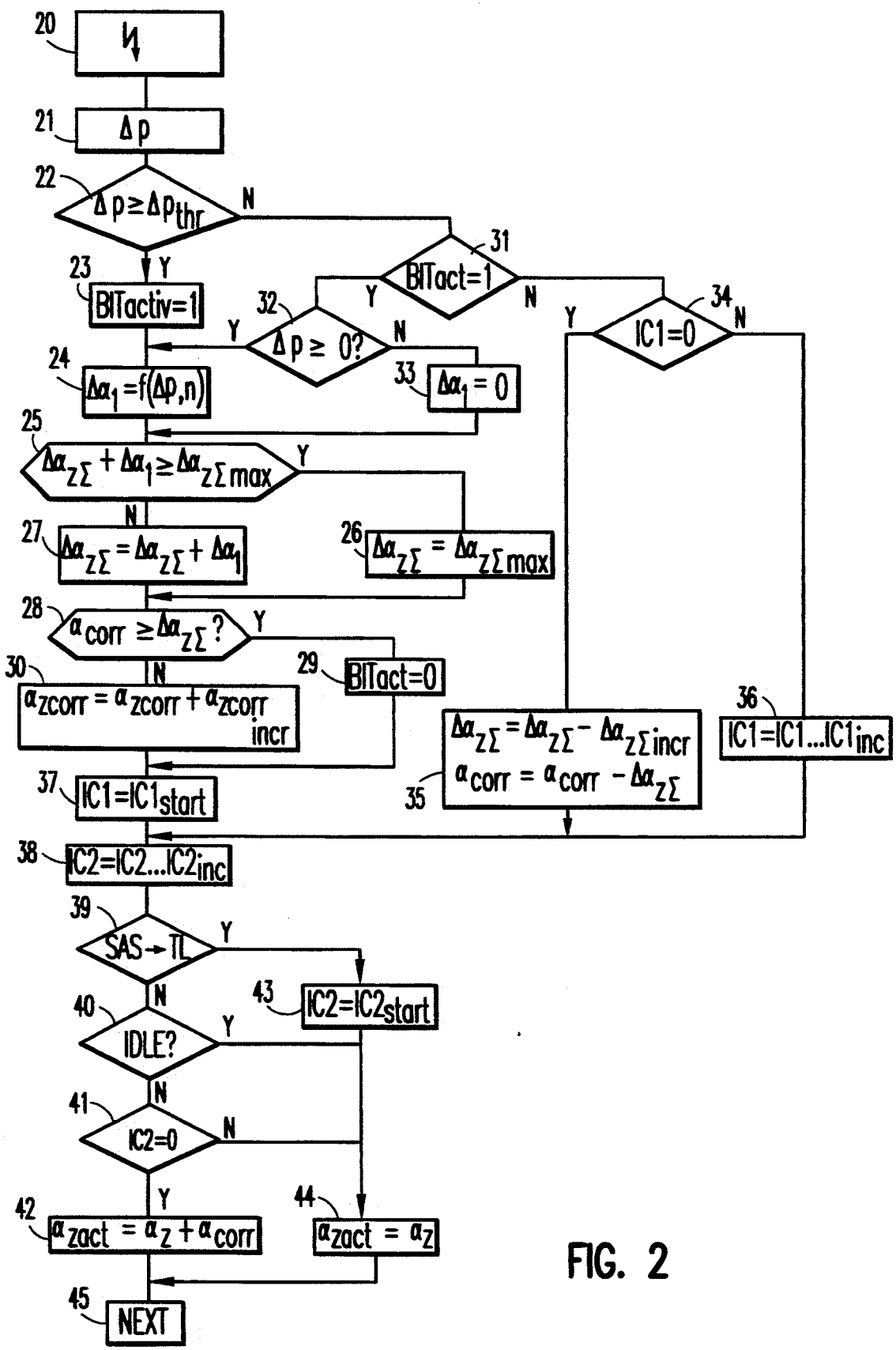

FIG. 2 is a flowchart for cyclically executing the method in accordance with the invention. In a first step, i.e. step 20, an ignition event is detected. Following each ignition, a load p is detected in a processing step 21, and the difference $\Delta p$, between the load p and a previously detected and temporarily stored load value, is calculated.

Following this, a decision step 22 determines whether the detected load difference $\Delta p$ os greater than or equal to a predetermined threshold value $\Delta p_{thr}$. If this is the case, an active bit is set to 1 or "HIGH" in a processing step 23. This simply means that the method for damping abnormal vibrations or bucking is being activated.

In a following processing step 24, an ignition adjustment angle $\Delta \alpha_1$ is calculated on the basis of the operating parameters of the combustion engine, such as, in particular, the load difference $\Delta p$ and engine speed n. A comparison and decision step 25 thereafter determines whether an adjusted ignition angle $\Delta \alpha_{z\Sigma}$, after the addition of that portion constituting the ignition adjustment angle $\Delta \alpha_1$, is greater than or equal to a maximum permitted adjusted ignition angle $\Delta \alpha_{z\Sigma max}$.

If this is the case, the Y, or YES-output of decision-step 25 leads to a processing step 26, where the adjusted ignition angle $\Delta \alpha_{z\Sigma}$ is set to the maximum ignition adjustment angle $\Delta \alpha_{z\Sigma max}$. The N, or NO-output of the comparison and decision step 25 leads to a processing step 27 where the actual ignition adjustment angle portion $\Delta \alpha_1$ is added to the total ignition angle. The output of processing step 26 and the output of processing step 27 lead to a decision step 28.

A determination is made by the decision step 28 as to whether the actual ignition adjustment angle portion $\Delta \alpha_1$ is greater than or equal to the adjusted ignition angle $\alpha_{z\Sigma}$. If this is the case, the YES-output of the decision step 28 leads to a processing step 29 where the active bit for the ignition angle adjustment for damping abnormal vibrations is reset to zero. In this manner, the resetting of the adjusted ignition angle $\alpha_{z\Sigma}$ and or $\alpha_{corr}$ is made possible, or is initiated. A NO-output of the decision step 28 would lead to actuation of a processing step 30. In a processing step 30, the corrective ignition angle $\alpha_{corr}$ is incremented in small steps so that adjustment of the ignition will proceed in small steps along a ramp. In this manner, excessive jumps in ignition angles are prevented and drivability is improved.

Parallel to the method described thus far, further operational steps are required. Thus, if the output of the decision step 22 is negative, i.e. if the load difference $\Delta p$ is less than a predetermined threshold value, a decision step 31 determines whether the active bit has already been set for adjusting the ignition angle. If this is the case, the YES-output of decision step 31 leads to a decision step 32 where a determination is made as to whether the load difference $\Delta p$ is greater than or equal to zero ($\Delta p \geq 0$).

If this is the case, the YES-output of decision step 32 leads to the input of a processing step 24 which determines the ignition adjustment angle $\Delta \alpha_1$ on the basis of actual or instantaneous operating parameters. The NO-output of the decision step 32 leads to a processing step 33 which, at a load difference $\Delta p < 0$, will issue an ignition adjustment angle portion $\Delta \alpha_1$ of zero value; in other words, any positive load difference $\Delta p$ will result in an increase of $\Delta \alpha_{z\Sigma}$, and any negative load difference $\Delta p$ will add nothing to $\Delta \alpha_{z\Sigma}$. The output of processing step 33 leads to the input of the decision step 25. The NO-output of decision step 31 leads to a decision step 34. A determination is made by decision step 34 as to whether a first ignition counter IC1 is set at zero. If this is the case, a processing step 35 will cause the correction ignition angles $\alpha_{corr}$ and $\Delta \alpha_{z\Sigma}$ to be reset incrementally, that is to say, as long as the ignition counter IC1 is set at a value of IC1=0, the corrective ignition angle $\alpha_{corr}$ remains unchanged.

The NO-output of decision step 34 leads to a processing step 36 where an ignition counter IC1 is incremented to $IC1_{inc}$ in predetermined steps or gradients of engine rotation.

The outputs of processing steps 29 and 30 lead to a processing step 37. The processing step 37 sets the ignition counter IC1 to a predeterminable initial value $IC1_{start}$, the initial value being such that the instant at which it will be applied is definable, and that, on the one hand, it constitutes an emergency escape from the ignition adjustment angle and that, on the other hand, it prevents resetting of the adjustment $\alpha_{corr}$ prior to the local maximum engine speed. The output of processing step 37, like the outputs of processing steps 35 and 36, leads to a processing step 38.

A second ignition counter IC2 ... $IC2_{inc}$ is incremented in processing step 38. Following this, a decision step 39 determines whether there has been a change from a given throttle setting or a transition from engine braking operation SAS to the part-load range TL. If not, the NO-output of the decision step 39 connects to a decision step 40 which determines whether the combustion engine is idling. If it is not, a succeeding decision step 41 determines whether the contents of the ignition counter IC2 equals zero. If the engine is idling (LL), the ignition angle correction $\alpha_{corr}$ is not added to the ignition angle. If the determination of decision step 41 is positive, its YES-output connects to a processing step 42 in which the actual ignition angle $\alpha_{zact}$ is defined by adding the ignition correction angle to the effective ignition angle $\alpha_{zact} = \alpha_z + \alpha_{corr}$).

The YES-output of the decision step 39 leads to a processing step 43 where a second ignition counter IC2 is set to an initial value $IC2_{start}$. Where the system is operated under engine braking SAS, fuel injection is turned off or discontinued. In the transition from engine braking SAS to partial load TL, care must be taken not to commence with excessively retarded ignition angles as this may lead to slow combustion because of the poor state of the fuel mixture. These, in turn, cause ignitions in the intake pipe.

The second ignition counter IC2 thus serves to render the retarding adjustment $\alpha_{corr}$ of the anti-bucking function effective only after the state of the fuel mixture reliably permits more retarded ignition angles as effective ignition angles. The second ignition counter IC2 thus provides for a delay in the correction of the ignition angle under certain operating conditions, such as during transition from engine braking to part load TL. The output of processing step 43, the YES-output of the decision step 40 and the NO-output of decision step 41 lead to a processing step 44 in which the effective ignition angle is commanded as the actual ignition angle $\alpha_z$. The outputs of the processing steps 42 and 44, in turn, lead to a processing step 45 in which the next cycle of ignition angle adjustment or correction is initiated.

What is claimed is:

1. A method of damping bucking oscillations of a spark ignition engine, comprising the steps of:
   measuring engine rotational speed (n);
   reducing the torque of said engine at increases in engine rotational speed;
   increasing the torque of said engine at decreases in engine rotational speed;
   namely by periodically measuring the instantaneous load (p) of said engine;
   temporarily storing a first value (p1) representative of said load;
   comparing said first value against a second value (p2) representative of a subsequently measured load;
   establishing (21) a third value ($\Delta p$) representative of the difference between said first and second values;
   adjusting (24) the ignition angle as a function of said third value and of said engine rotational speed (n); and limiting (26) said adjustment of said ignition angle in order to avoid excessive change in engine rotational speed.

2. The method of claim 1, further including the step of comparing (22) said third value against a threshold value.

3. The method of claim 2, further including the step of adjusting the ignition angle only when (23) said third value exceeds said threshold value.

4. The method of claim 1, wherein said step of limiting said ignition angle includes incrementally resetting (30) said ignition angle to an ignition angle determined by engine characteristic, for gradually changing said engine rotational speed in accordance with a predetermined function.

5. The method of claim 4, wherein the step of incrementally resetting (35) the ignition angle determined by engine characteristics is accomplished by using (36) an ignition counter (IC1), counting engine ignition events.

6. The method of claim 5, wherein said ignition angle is reset toward said ignition angle determined by engine characteristics in a greater number of incremental steps whenever a large change in engine rotational speed (n) has occurred than when only a small change in engine speed occurred.

* * * * *